United States Patent

[11] 3,614,029

| [72] | Inventor | Karl Eickmann<br>2420 Isshiki, Hayama-machi, Kanagawa-ken, Japan |
|---|---|---|
| [21] | Appl. No. | 48,863 |
| [22] | Filed | June 12, 1970 |
| [45] | Patented | Oct. 19, 1971<br>Continuation of application Ser. No. 770,912, Oct. 28, 1968, Continuation-in-part of application Ser. No. 552,608, May 24, 1966, now abandoned, Continuation of application Ser. No. 328,395, Dec. 5, 1963, now Patent No. 3,320,898, dated May 23, 1967. |

[54] ADDED FLUIDFLOW CONTROL MEANS FOR GOVERNING THE ATTITUDE OF FLUIDBORNE VEHICLES
11 Claims, 7 Drawing Figs.

[52] U.S. Cl. .................................................. 244/17.23, 244/60
[51] Int. Cl. .................................................. B64c 27/08
[50] Field of Search .......................................... 244/17.23, 17.21, 17.19, 17.11, 60, 53; 115/34

[56] References Cited
UNITED STATES PATENTS

| 984,269 | 2/1911 | Friedel | 244/53 |
| 1,827,438 | 10/1931 | Rauch | 244/60 |
| 2,212,490 | 8/1940 | Adler, Jr. | 244/60 UX |
| 2,454,138 | 11/1948 | Delzer | 244/60 X |
| 2,514,822 | 7/1950 | Wolfe, Jr. | 244/17.23 X |
| 2,793,576 | 5/1957 | Carpi | 60/53 UX |

FOREIGN PATENTS

| 58,961 | 5/1913 | Austria | 244/17.11 |
| 1,148,657 | 6/1957 | France | 244/17.21 |
| 598,654 | 2/1948 | Great Britain | 115/34 |

Primary Examiner—Milton Buchler
Assistant Examiner—Paul E. Sauberer
Attorney—McGlew & Toren ABSTRACT: A fluidborne vehicle, such as an aircraft, has two propellers positioned symmetrically on either side of a longitudinal centerline of the vehicle, or has two pairs of propellers, with the pairs positioned symmetrically on opposite sides of the longitudinal centerline. The propellers are driven by respective hydraulic motors and each motor is connected by supply and return flow lines to a source of hydraulic fluid under pressure and independently of each other hydraulic motor, the hydraulic flows to all of the motors being equal or in a fixed proportion to each other. An additional source of hydraulic fluid under pressure has control means for selectively augmenting or decreasing the flow to a selected hydraulic motor.

PATENTED OCT 19 1971 3,614,029
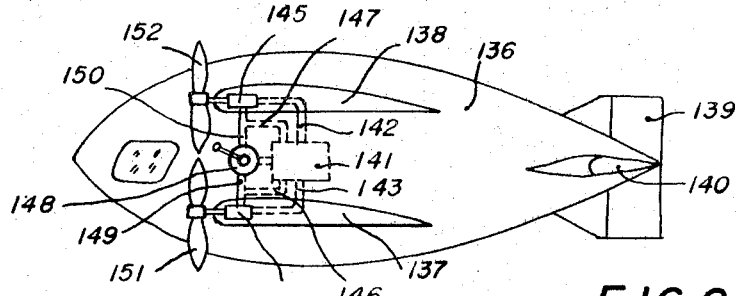
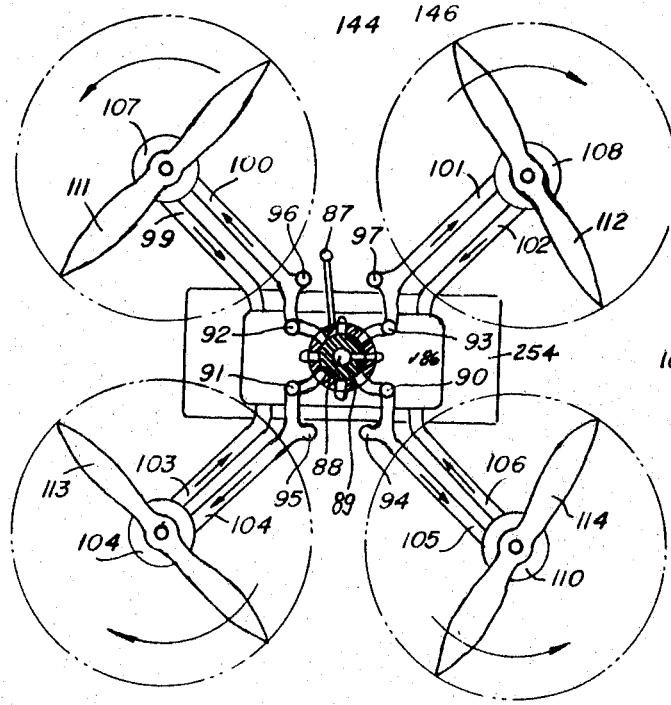
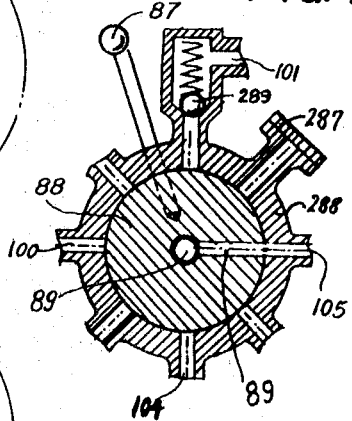
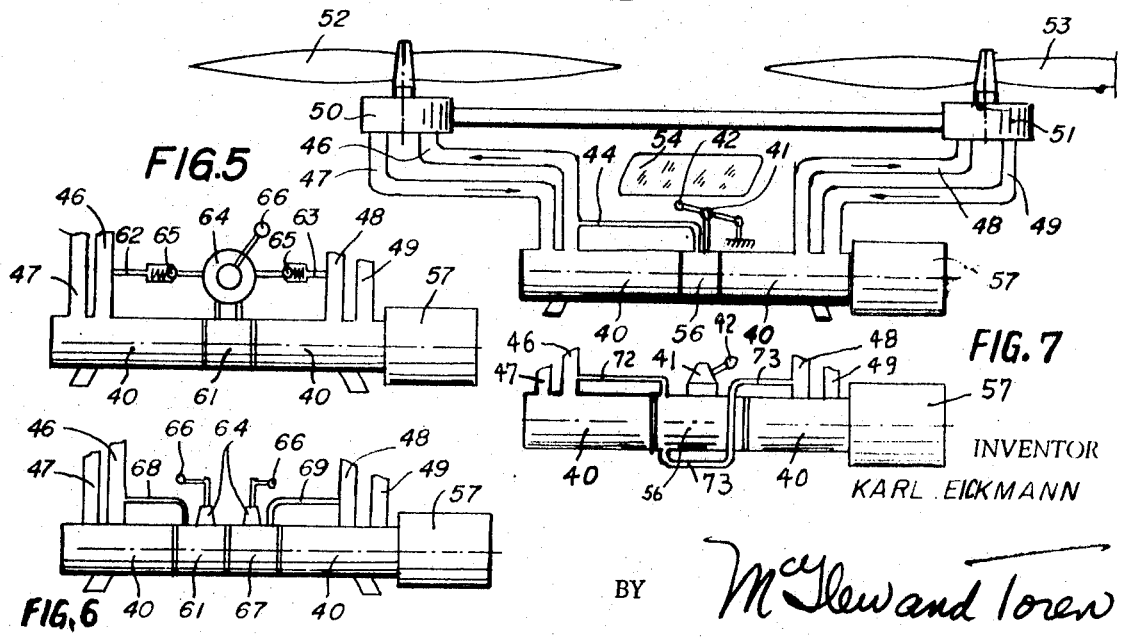
INVENTOR
KARL EICKMANN
BY McGlew and Toren
ATTORNEYS 3,614,029

ADDED FLUIDFLOW CONTROL MEANS FOR GOVERNING THE ATTITUDE OF FLUIDBORNE VEHICLES

BACKGROUND OF THE INVENTION

This application is a continuation of application Ser. No. 770,912, filed on Oct. 28, 1968, which is a continuation-in-part of my copending application Ser. No. 552,608, filed May 24, 1966, now abandoned, and which is, in turn, a continuation of my copending application Ser. No. 328,395, filed Dec. 5, 1963, and now U.S. Pat. No. 3,320,898, issued May 23, 1967.

The object of this invention is to improve those vehicles, so that their attitudes, flight movements or positions can be controlled by means of an additional flow of fluid, which acts as control flow and which is led into one or more of the separated fluid flows in order to drive at least one of the positive displacement motors at a higher rotary angular velocity for controlling the attitudes or actions of the vehicle.

Another object of the invention is to make it possible by the addition of a control flow to improve the vehicle so that it can be used not only as aircraft, but also as helicopter, ship, air cushion vehicle or for any other fluidborne vehicle service.

Another object of the invention is to provide a fluidborne vehicle wherein two revolving members or propellers are driven by hydraulic motors; wherein each separated flow of fluid drives a respective hydraulic motor and wherein a third flow of fluid is provided and delivered into a control valve means, while that control valve means is able to direct the movement of the third flow, which may also be called the control flow, to one or the other of the respective separated flows for driving the motors and the revolving members connected thereto. The control valve means is provided with means to prevent accidental intercommunication between plurality of main flows.

Still another object of the invention is to provide a fluidborne vehicle, especially a helicopter, with at least four revolving members or propellers connected to respective hydraulic motors, wherein each of the hydraulic motors is driven by a separated flow of fluid with substantially equal or proportional velocities of all the motors, and wherein at least one more control flow is provided which is delivered to a control valve means, and wherein that control valve means is able to direct the movement of the control flow into one or more of the respective main flows of fluid, so that, thereby, the rotary velocity of one or more of the rotary hydraulic motors become increased in a limited extent, and, thereby, the movement, the attitude, or the inclination of the fluidborne vehicle becomes changed, directed or controlled.

Another object of the invention is to provide a fluidborne vehicle having wings and propeller motors, especially hydraulic motors, connected thereto for driving revolving members or propellers, wherein each of the hydraulic motors is driven by a separated flow of fluid with substantially equal or proportional delivery quantity respective to another or others of the hydraulic motors; and wherein at least one control flow is provided for flow to a control means, and therethrough and whereby said control flow is directed by the control means to flow into one or another of the separated hydraulic flows or to flow in none of them so that by the said control flow the rotary velocity of at least one hydraulic motor or propeller can be increased in a limited extent in order to thereby change, correct, control or vary the rotary velocity of the respective hydraulic motor and thereby the attitude, movement or inclination of the respective vehicle.

A further object of the invention is to create the additional flow in a variable and reversible pump means, for selectively either adding or subtracting an additional flow to or from a communicated main flow.

Another object of the invention is to utilize the additional control flow for inclining the axis of an airborne vehicle for the purpose of directing the movement of the airborne vehicle.

According to another object of the invention, one-way check valves are provided between the control means and the main flows to prevent accidental intercommunication between main flows; and according to another object of the invention a plurality of additional flows is provided, each one communicated separately to another main flow.

BRIEF DESCRIPTION OF THE DRAWING

More objects, features and details of the invention will become apparent from a study of the accompanying drawings, wherein:

FIG. 1 is an elevation view of a fluidborne vehicle of helicopter embodying the invention, and including two positive displacement fluid motors each driving a respective propeller, the motors being supplied by separated flows of fluid with equal or proportional delivery, and control means being provided to selectively deliver an additional or control fluid to one of the motors;

FIG. 2 is a plan view of another form of fluidborne vehicle, such as a helicopter, embodying the invention and having four hydraulic motors each driving a respective propeller; and FIG. 3 is an elevation view of a winged fluidborne vehicle, having plural propellers each driven by a respective hydraulic motor and including the control means of the invention;

FIG. 4 is a partial enlargement of the section through the control means of FIG. 2 and partially a sectional view through fluid line connections thereof;

FIG. 5 shows an alternative of the fluid-handling devices of FIG. 1 in a longitudinal view;

FIG. 6 shows another alternative of the fluid-handling devices of FIG. 1 in a longitudinal view; and FIG. 7 shows a still further alternative of fluid-handling devices of FIG. 1.

Referring now to the drawings, it will be seen that, in FIG. 1, a fluidborne vehicle is shown which has powerplant 57 and a fluid-flow-producing means 40 for producing two separated flows of fluid. One flow of fluid is passed through the fluid line 46 to the hydraulic motor 50 for revolving the same and thereby revolving the rotatable member 52 thereon. The fluid flow flows through return line 47 back to the fluid-flow-producing means 40. The other flow of fluid flows from the fluid-flow-producing means 40 through fluid line 48 to the hydraulic motor 51 for driving the same and for revolving the rotary member 53 thereon; while thereafter the flow of fluid returns through the return pipe 49 preferably via cooling means back to the fluid-flow-producing means 40.

The whole vehicle may be kept together by bar or body 39 with cabin 54 borne thereon or connected thereto. The specialty of this embodiment is that an additional flow of fluid of a limited rate of flow for the additional flow of fluid variable capacity is preferred. The additional flow, which may also be termed a control flow, flows through the control flow pipe 44, into one of the main fluid lines, for example into fluid line 46. The additional flow may be produced in variable pump means 56 and/or control device 41 with operator 42. The fluid-flow-producing means 56 for producing the additional flow of fluid in FIG. 1 is reversible and variable. If operator 41 is moved in one direction, the additional flow is led into fluid line 46 and added to the flow therethrough. If operator 41 is moved in the other direction, then the direction of flow is reversed, so that fluid is subtracted from the fluid line 46. Arrangements for producing three or more completely separated flows of fluid, which may be at different pressures, are disclosed, for example, in U.S. Pat. No. 3,211,399 issued Oct. 12, 1965 (FIG. 6) and U.S. Pat. No. 3,174,432 issued Mar. 23, 1965.

By operating the rate of flow adjustment device 41 of additional fluid-flow-creating means 56, the additional or control flow is created and caused to flow into the fluid line 46 for increasing the rotary velocity of the hydraulic motor 50, or if the adjustment device is oppositionally operated, for subtracting fluid out of fluid line 46 for decreasing the rotary velocity of propeller motor 51. Depending upon in which rate of flow and in which direction the control flow flows, the respective motor will revolve a little faster or less fast, than the other and thereby the vehicle will tilt slightly and the movement of the vehicle will be influenced or controlled. In applying this control flow of the invention, it is important that the fluid-flow-producing means 56, for producing the control flow, must be of a positive displacement type and of restricted rate of flow, so that the rate of flow produced therein, is only a minor fraction of the main flows, and so that the vehicle does not incline more than a few percent from its neutral position. If the control flow would have a too large rate of flow, then the vehicle would incline too much by too much change of velocity of one of the propellers which might then cause the vehicle to tilt more and crash. Referring now to FIG. 2, this vehicle has the same abilities and mobility as that of FIG. 1. It has also four propellers. However, the rotary speed of the propellers is, in this case, not influenced by bypass means between the delivery and from flows of respective motors, but the control means is, in this case, provided by a control flow 89 which moves through a respective controller 88. This control flow 89 which may be directed through controller 88 by control lever 87, is an independent flow in addition to other four separated flows for driving the propeller motors 107–110. Depending thereon in which direction the control valve 88 is moved, the control flow flows either workless back through a respective return flow 98 or it flows into a respective one of the other four flows which are present in respective fluid lines 100–105. Depending thereon into which fluid line the flow of fluid is directed by the movable or rotary controller 88, the respective favored hydraulic motor runs faster and thereby the lift of the respective revolving member is stronger, so that the vehicle tilts in the respective direction. It is also shown by pipe means of fluid lines 96, 97, 94 and 95 that a plurality of hydrofluid-producing means may be provided in the vehicle 85 so that they combine together with other fluid flows provided from other fluid-flow-producing means, especially from respective four-flow delivery fluid-flow-producing means.

Again, it is a feature of FIG. 2 that the vehicle can move in all directions and that the control can be affected by a very simple control means 88 and by a respective separated control means flow. The main motors and propellers are revolving members which are driven by four separated flows of fluid, of equal or proportional delivery quantity, which are produced in a respective fluid-flow-producing means 86 or a plurality of such fluid-flow-producing means.

In FIG. 3 a vehicle is shown which can move horizontally and vertically, or horizontally or vertically. In the preferred embodiment it is an aircraft. The hydrofluid-flow-producing means 141 produces two flows of separated fluid with substantially equal or proportional rate of flow or delivery quantity. Fluid flow 146 flows through hydraulic motor 144 and returns therefrom through fluid line 143 directly or indirectly to the fluid-flow-producing means 141. The other flow of fluid flows through the fluid line 147 to the hydraulic motor 145 and drives the same and returns then through return pipe 142 directly or indirectly to the fluid-flow-producing means 141.

There is an additional, separated control flow produced, which flows to the control means 148 and which can be directed by the control means 148 through fluid line 150 into fluid line 147 or through fluid line 149 into fluid line 146. Depending thereon to which fluid line the control flow becomes directed the respective hydraulic motor 145 or 144 will then revolve faster and the attitude or movement of the vehicle can thereby be changed. If on the other hand the controller 148 is closed or set to resistanceless-flow-through, then no flow flows through the pipes 150 or 149 and then the respective motors 145 and 144 are revolving and continue to revolve with the same rotary velocity. By this simple means the attitude and movement of the vehicle of FIG. 3 can be very simply controlled and the vehicle is inexpensive in construction.

For example the vehicle 136 may rest vertically on ladders or feet 139 and 140. Control means 148 may stop the control flow or let the control flow return to its origin. If fluid-flow-producing means 141 then delivers enough fluid power in the main flows, propellers 151 and 152 may revolve with proportionate angular velocity and move the vehicle vertically, for example upwards or downwards. If it is intended that the vehicle then shall change to horizontal flight, then the control flow is directed through controller 148 and through fluid line 150 into motor 145 for revolving propeller 152 with a higher rotary velocity. Thereby the vehicle is tilted to horizontal position and flight. Once horizontal position is obtained, the rate of flow of the control flow may be reduced or the flow may be stopped. For inclining the vehicle with its forehead upwards the control flow may be directed through controller 148 into fluid line 149 and thereby into motor 144 for revolving the same faster. The propeller 151 revolves then also faster and the axis of the vehicle inclines upwards.

By making the control flow variable and controllable a very sensible and safe control for the flight position, flight movement, rest or attitude of the vehicle becomes possible.

It is however not necessary to provide only one control flow and a controller like cited by referential 41, 42, 87, 88, 89 and/or 148 of the figures.

On the contrary it is possible, to set one or more control flows to each of the separated main driving fluid flows to each of the separated main driving fluid flows and to control the rate of flow or to stop the flow of each of the control flows separately. That may be done by hand or by remote control. Electric or radar-remote control by respective signals can provide good automatic or remote control of the vehicle. For that purpose a transducer is set between the impulse receiver and the control means for directing the flow of a control flow or the rate of control flow or of a plurality thereof. Electronic—or radar—impulse receivers and intensifiers, and enlargement of their power by hydraulic fluid supply and control, are especially suitable for remote control of the control flow circuits of this invention. The fluid-flow-producing means for producing the control flow circuits of this invention may either supply constant flow of fluid with constant rate of flow or variable flows of fluid with variable rate of flow.

In FIG. 4 the section of FIG. 2 through the controller of the vehicle is demonstrated in an enlarged scale. Operating device 87 is attached in order to make the move or turn of control body 88 possible. Fluid of the additional or control flow flows through passage 89 into and through the control body 88. The port of control body 88 can be adjusted by operator 87 for communication with one of the fluid lines of the main flows, for example, for the selective communication with main flow 100, 101, 104 or 105. The housing 288 of the controller is so designed and the passage 89 is so restricted in dimension that port 88 of the control passage 88 can be communicated at the same time only to one of the main flow passages and that enough sealing surface remains between the port 88 and the next communication to a main fluid line, that never a communication to more than one main fluid line is possible and also in such a way, that fluid can never escape through the controller from one main fluid line to another. This design is important, because, if the sealing of the control flow and of the fluid lines of main flows from each other is not assured, flow might escape from one of the main fluid lines into another and that could result in uncontrolled increase or decrease of the rotary angular velocity of one or more propellers. In turning the controller 88, communication of the control flow can selectively be made to either one of the fluid lines 100, 101, 104 or 105, so that the added flow or control flow is led and added to the selected one of the main flows for revolving the respective fluid motor and propeller faster or less fast.

If more exit ports are provided in the control housing 288, than are needed, then a closing means 287 is to be provided to the respective exit ports of the control housing 288.

It is especially convenient to provide one-way check valves within the fluid lines between the controller and the main fluid lines. That is for example demonstrated by check valve 289 between controller 88 and fluid line 101 and also in FIG. 5 within the control fluid flow lines 62 and 63. In the latter figure the check valves are demonstrated by referentials 65. The one way valves or check valves are to be assembled in such a way, that flow from the controller or from the additional fluid-flow or control-flow-producing means to the respective main fluid line is possible, but that rather return flow from the associate main fluid line to the controller of control-flow-producing means is impossible by blocking such direction of flow. Such one-way valves are provided only in such embodiments, which serve for adding a control flow fluid to a main flow, but not for subtracting fluid from a main flow.

The one-way valves assembled into the respective fluid line, as described above, assure that fluid can never escape from a main fluid line, and that fluid never accidentally could flow from one main fluid line into the other. Because, if in a fluidborne vehicle, fluid could flow from one propeller driving main fluid line into another, then the angular rotary velocity of one or more of the propellers would change by accident, for example, by turbulence within the air or fluid wherein the vehicle is borne and that could result in inclination, tilting or accidental crash of the vehicle. It has been one of the main mistakes of the former art, not to take enough care for the prevention of escape of fluid from one main fluid line into another. This mistake has made fluidborne vehicles of the former inoperable, because of the lack of safety involved, as described above.

In FIG. 5 an alternative of fluid-producing means is shown. Powerplant 57 drives fluid-flow-producing means 40 and 61. It is preferred to set them on the same axis or to connect them otherwise so that they are all caused to revolve with equal or definite proportionate rotary angular velocity. Each one fluid-flow-producing means 40 delivers a flow of equal or proportional rate of fluid into one main fluid line 46 or 48 for revolving the respective associated fluid motor and rotary member or propeller with definite proportionate rotary angular velocity. Fluid-flow-producing means 61 is also a positive displacement fluid-flow-producing means and its inventive feature is, that the volume of the displacement chambers therein are definitely of only a minor fraction of the volumes of the displacement chambers of the main fluid-flow-producing means 40. Thereby it is assured, that the rate of flow of the added flow or control flow, produced in fluid-flow-producing means 61 remains at all times only a minor fraction compared to the propeller driving main flows through fluid lines 46 and 48. The added or control flow is passed from fluid-flow-producing means 61 into and through control means 64. The controller 64 operated by the operator 66 is able to selectively connect the added fluid flow from producing means 61 either to main fluid line 46 or 48 but never to both of them at the same time. In order to prevent communication between the main flows 46 and 48 through controller 64, the one-way valves 65 are inserted into the fluid lines 62 and 65 from controller back or out of fluid line 46 or 48 to controller 64 or into the other fluid line. Fluid-flow-producing means 61 is preferred to be variable from zero to a maximum rate of flow, so that the rate of flow of the control flow can be definitely volumetrically controlled and adjusted. The producing means 61 must be of positive displacement type and be able to deliver a pressure in fluid as high or higher than the pressure in the main flows.

In FIG. 6 it is demonstrated, that instead of providing only one additional or control-flow-producing means, a plurality of control-flow-producing means can be provided. It is important, that each of them is then connected to a respective propeller driving main fluid line. For example producing means 61 to main fluid line 46 and fluid-flow-producing means 67 to main fluid flow line 48. For this purpose control fluid line 68 is provided from producing means 61 to main fluid line 46 and control fluid line 69 is provided from producing means 67 to main fluid line 48. Fluid-flow-producing means 61 and 67 may, each one separately, be provided with a rate of flow adjustment device 64 and an operating means 66 thereto. Regarding variability of flow and of the volume and maximum of rate of fluid flow out of producing means 61 and 67, the same applies, as described heretofore at the description of FIG. 5. The embodiment of FIG. 6 and similar concepts for multiple control flows have the feature that the controller for the direction of the control flow into one or the other main flows can be spared and at the same time intercommunication through controllers can be effectively prevented.

While in the embodiment of FIG. 1 the control flow fluid-flow-producing means is of reversible and variable types so that, selectively, either the control flow is used to add or to subtract a minor fraction of the rate of flow of the main flows to or from the fluid line 46 and the associated propeller motors, in the outer embodiments, especially in embodiments of FIG. 5 and 6, it is enough, if the control-flow-producing means is variable in one direction between zero and maximum rate of flow, but not reversible.

In the vehicle of FIG. 2 the vehicle is seen from above, so that the propellers, motors and fluid lines are visible. Referential 86 show the fluid-flow-producing means and referential 254 shows the cabin of the vehicle.

In the vehicle of former art, the control of the difference or equality between different propeller motor driving main flow was effected by controllers, which could communicate to one or another or to some of the main flows. Such controllers however were not secured against flow through the controller from one fluid into the other. Therefore, at times, when there are turbulances in the fluid, wherein the vehicle is borne or moved, like air pockets, fluid could escape from one propeller motor through the associated fluid line and through the unsafe controllers of the past into another fluid motor, so that an intercommunication between two propeller driving motors could accidentally occur. This could result in uncontrolled decrease or increase of the rotary angular velocity of one propeller relative to others. The consequence thereof could be tilting and crashing of the vehicle.

It is therefore one main feature of this invention, that intercommunication between different propeller driving main fluid lines remains at all times prevented. The vehicle is therefore safe, because accidental change of rotary velocity of one or more of the propellers is prevented, since at all times the main fluid flows to the propeller motors remain separated from each other.

Another important feature of the embodiments of this invention is that the rate of flow of the control flow is definitely restricted to remain at all times a minor fraction of the rate of flows of the propeller driving main flows. This is assured by connecting the fluid-producing means so that they revolve at all times at definite proportionate rotary velocity and thereby, that the sum of the volumes of the displacement chambers in the control-flow-producing means is restricted to a minor fraction of the sum of volumes of the displacement chambers of the main fluid-flow-producing devices. The consequence thereof is that at vertically propelled vehicles the vehicles can never tilt and therefore never crash. They can only incline in a limited extent so as to direct the speed or direction of the vehicle. Because the control flow remains of such little rate of flow, that the associated propeller can revolve only a few percent faster or less fast than the other propellers. At such little difference in speed, the vehicle can only incline a few percent but never tilt, regardless, of turbulances in the fluid in which the vehicle moves and regardless of how big the handling mistakes of the vehicles's pilot may be.

Only FIG. 3 is an exception from the restricted concept. Vehicle of FIG. 3 can be changed from the vertical to horizontal movement by means of the control flow actuation. The control flow of the vehicle of FIG. 3 can therefore be of larger rate of flow and the vehicle of FIG. 3 can be operated by more experienced pilots only. Otherwise the vehicle could tilt and crash, if the utilization and handling of the large control flow is not volumetrically handled and controlled.

In FIG. 7 the further positive displacement fluid-flow-producing means 56 is of the reversible type, as in FIG. 1. Rate of the flow and reversing of flow direction is effected by rate of flow adjustment means 41 with its operating means 42. The inventive novelty of FIG. 7 is, that one port of fluid-flow-producing means 56 is connected to one of the separate main flow delivery lines and the other port of it is connected to another of the separate main flow delivery lines. For example fluid port 72 by fluid line 72 to main line 46 and fluid port 73 by fluid line 73 to main line 48. If the further fluid-flow-producing means is in rate of flow "zero position," then no fluid flow flows through and it acts as a separator between the associated main delivery fluid lines. If the adjustment means 42 actuated a flow of fluid through the further fluid-flow-producing means then one of its ports is an intake or entry port and the other an exit port. Fluid is then transferred from one main flowline i.e. 46 through the further fluid-flow-producing means 56 into another main flow line i.e. 48 or vice versa. Direction of flow can be reversed and rate of flow controlled by adjustment means 42. Consequently a restricted difference between the rotary angular velocities of the propelling means or rotary members is positively achieved and volumetrically exactly controlled for governing the percentage of inclination of the vehicle.

In all cases of the embodiments it is necessary, that the displacement chambers of the further fluid-flow-producing means are in its sum or total only a minor fraction of the sum of the displacement chamber of the main fluid-flow-producing means in order to restrict the maximum rate of flow of the additional or control flow to a minor fraction of the main flows. In order to prevent slip, the third flow-producing devices are preferred to be of the positive displacement type and its rotary members connected to each other for revolving at all times with proportionate velocity.

What is claimed is:

1. A fluidborne vehicle comprising, in combination, a body; plural positive displacement hydraulic-fluid operated motors on said body; a main positive displacement hydraulic fluid-flow producing means on said body having plural separate outlets and delivering separate flows of hydraulic fluid, of constantly proportionate rates, to said outlets; respective separate supply lines connecting each motor to a respective outlet of said fluid-flow-producing means; plural rotary propelling means each driven by respective hydraulic-fluid operated motor, whereby said propelling means are driven at constantly proportionate angular velocities; further positive displacement hydraulic fluid-flow-producing means on said body having a fluid flow output capacity which is only a minor fraction of the rate of fluid flow through each outlet of said main fluid-flow-producing means; said further fluid-flow-producing means producing an additional flow of fluid at a rate which is only a minor fraction of the rate of flow in each of said supply lines; means connecting said further fluid-flow-producing means to said supply lines and operable to direct said additional fluid flow into a selected one of said supply lines to effect a limited increase in the angular velocity of the connected motor and the associated propelling means; and adjustment means operable to adjust the rate of flow of said further positive displacement fluid-flow-producing means.

2. A fluidborne vehicle as claimed in claim 1, wherein said vehicle is an aircraft having wings and said propelling means are respective propellers each driven by a respective hydraulic-fluid-operated motor; said propellers including two pairs of propellers, one pair on each side of said body, and the two propellers of each pair being respective different levels.

3. A fluidborne vehicle, as claimed in claim 1, in which both said main fluid-flow-producing means and said further fluid-flow-producing means are interconnected to be driven at constantly proportionate angular velocities.

4. A fluidborne vehicle, as claimed in claim 1, in which said adjustment means includes control means connected to said further positive displacement flow-producing means and, by respective separate further fluid lines, to said separate supply lines, for selectively connecting said further positive displacement fluid-flow-producing means to one selected separate supply line at a time; and sealing means in said control means separating said further fluid lines from each other.

5. A fluidborne vehicle, as claimed in claim 4, including a respective one-way check valve in each further fluid line providing flow from said control means to blocking return flow to said control means.

6. A providing vehicle, as claimed in claim 1, wherein a plurality of separate further fluid-flow-producing means are provided, each connecting with a respective different separate supply line.

7. A fluidborne vehicle, as claimed in claim 1, in which said means connecting said further fluid-flow-producing means to said supply lines comprises respective further fluid lines; and respective one-way valves in each further fluid line preventing reverse flow of fluid therethrough.

8. A fluidborne vehicle, as claimed in claim, in which there are two fluid motors each driving a respective propeller, said fluid-flow-producing means producing two separated flows of fluid of constantly proportionate rates of flow and each delivered through a respective separate supply line to a respective one of the two fluid motors; said further means producing a third and limited flow of fluid; said control means comprising a control valve means selectively operable to direct said third flow to a selected one of said supply lines for driving a selected one of the motors, and its associated propelling means, at a higher angular velocity, slightly higher than that of the other motor and its associated propeller means.

9. A fluidborne vehicle, as claimed in claim 1, in which said vehicle is a helicopter having a least four propellers constituting said rotary propelling means and each driven by a respective hydraulic motor constituting one of said positive displacement fluid motors; each motor having respective separate supply line connected thereto for delivery of constantly proportionate rates of flow of fluid to all of said motors; and further means producing at least one additional and limited flow of fluid said control means comprising control valve means selectively operable to direct the fluid of the additional and control flow of fluid into at least one of said supply lines whereby to increase the angular velocity of the hydraulic motor connected thereto and the propeller driven by such hydraulic motor limited amount to change the movement, attitude or inclination of the vehicle.

10. A fluidborne vehicle, as claimed in claim 4, in which said further means is operable to supply said additional limited flow of fluid to each of said supply lines; said control means comprising plural control means each associated with a respective supply line and selectively operable to deliver a limited control flow into its respective supply line.

11. A fluidborne vehicle, as claimed in claim 1, including a variable and reversible positive displacement means having one port connected to one of said supply lines and another port connected to another of said supply lines for volumetric positive-controlled transfer of a minor fraction of fluid in either direction between the supply lines to which it is connected.